United States Patent
Fan

(10) Patent No.: US 8,581,646 B2
(45) Date of Patent: Nov. 12, 2013

(54) CHARGE PUMP CIRCUIT

(75) Inventor: Fangping Fan, Chengdu (CN)

(73) Assignee: IPGoal Microelectronics (SiChuan) Co., Ltd., Chengdu, Sichuan Province (CN)

( * ) Notice: Subject to any disclaimer, the term of this patent is extended or adjusted under 35 U.S.C. 154(b) by 169 days.

(21) Appl. No.: 13/105,894

(22) Filed: May 12, 2011

(65) Prior Publication Data

US 2011/0279172 A1  Nov. 17, 2011

(30) Foreign Application Priority Data

May 12, 2010 (CN) .......................... 2010 1 0170392

(51) Int. Cl.
*H03L 7/06* (2006.01)
(52) U.S. Cl.
USPC .......................................................... 327/157

(58) Field of Classification Search
USPC .................................. 327/147, 148, 156, 157
See application file for complete search history.

(56) References Cited

U.S. PATENT DOCUMENTS

| | | | | |
|---|---|---|---|---|
| 5,592,120 A * | 1/1997 | Palmer et al. | .................. | 327/536 |
| 6,664,829 B1 * | 12/2003 | Hughes | .......................... | 327/157 |
| 6,897,733 B2 * | 5/2005 | Wakayama | ...................... | 331/17 |
| 7,176,731 B2 * | 2/2007 | Baez et al. | ..................... | 327/157 |
| 7,570,105 B1 * | 8/2009 | Baek et al. | ..................... | 327/536 |
| 7,733,136 B2 * | 6/2010 | Chen et al. | ..................... | 327/148 |
| 7,965,117 B2 * | 6/2011 | Wadhwa et al. | ............... | 327/157 |

* cited by examiner

*Primary Examiner* — Jeffrey Zweizig

(57) ABSTRACT

A charge pump circuit includes a switching circuit for providing a charge and discharge current, and a control circuit for controlling the switching circuit. The switching circuit includes a first switch for controlling the charging speed. The control circuit generates a signal for controlling the first switch based on the pulse width of the input signal. The charge pump circuit of the present invention quickens the locking time of the phase locked loop.

10 Claims, 1 Drawing Sheet

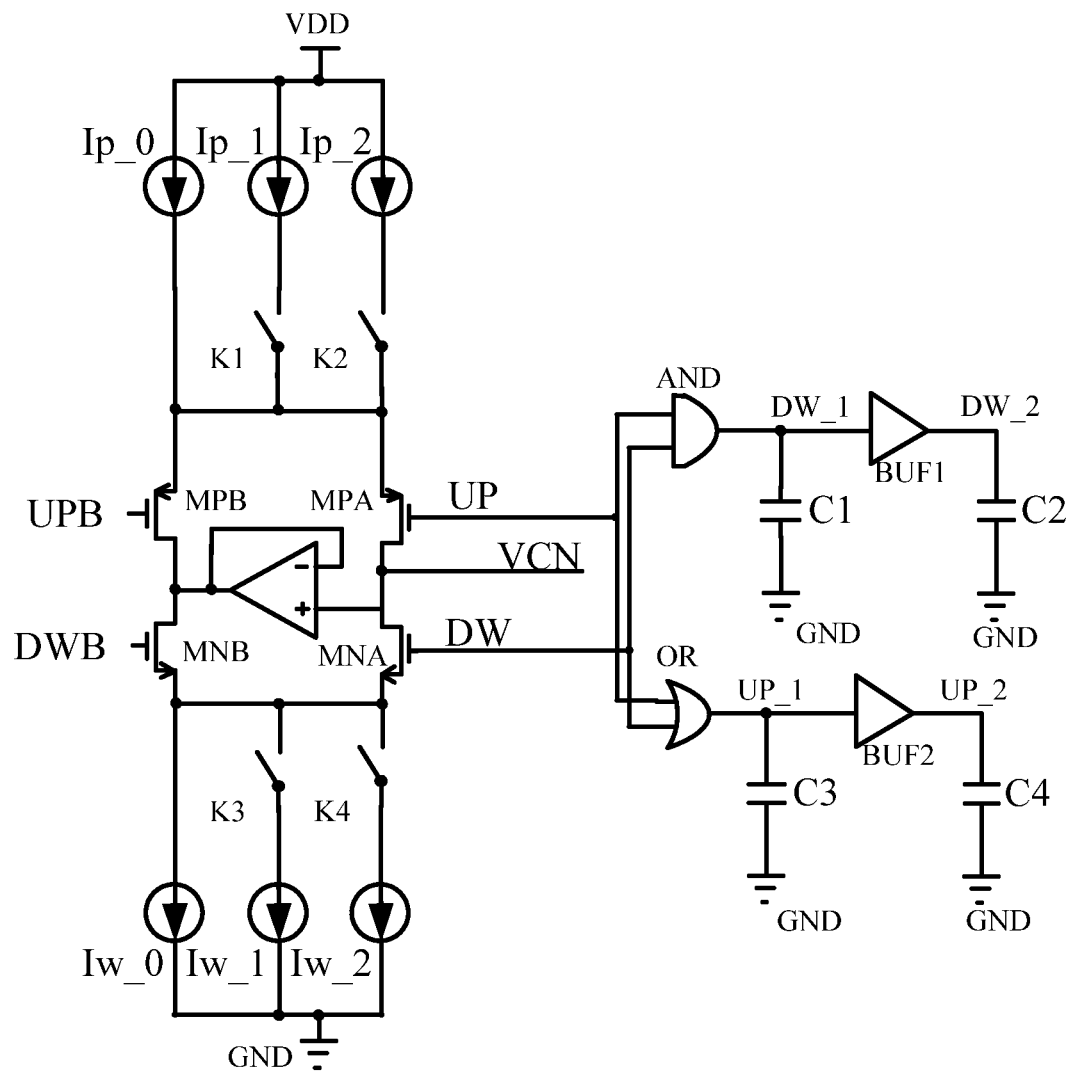

CHARGE PUMP CIRCUIT

BACKGROUND OF THE PRESENT INVENTION

1. Field of Invention

The present invention relates to a control circuit, and more particularly to a charge pump circuit which is capable of automatically adjusting the charge and discharge current based on the impulse width of the signal.

2. Description of Related Arts

The phase separation between the output signal and the input signal of the phase-locked loop (PLL) and delay-locked loop (DLL) is needed to be identified by the phase frequency detector. The phase separation is integrated by the charge pump such that the integral result is embodied in the control voltage in the form of the voltage variation. The control voltage is used to control the voltage control oscillator or voltage-controlled delay line till the phase synchronization between the two signals is achieved. In generally, the conventional charge pump circuit only has a branch of working current, so that the locking time of the phase locked loop is limited.

SUMMARY OF THE PRESENT INVENTION

An object of the present invention is to provide a charge pump circuit which is capable of quickening the locking time of the phase locked loop.

Another object of the present invention is to provide a charge pump circuit which is capable of automatically adjusting the charge and discharge current based on the impulse width of the signal.

Accordingly, in order to accomplish the above objects, the present invention provides a charge pump circuit comprising a switching circuit for providing a charge and discharge current, and a control circuit for controlling the switching circuit, wherein the switching circuit comprises a first switch for controlling a charging speed, the control circuit generates a first signal for controlling the first switch based on a pulse width of an input signal.

Preferably, the charge pump circuit further comprises a third capacitor and a fourth capacitor, the control circuit comprises an OR gate and a second buffer connected with the OR gate, wherein two input ends of the OR gate respectively receive two input signals, an output end of the OR gate is connected with ground through the third capacitor, the output end of the OR gate is connected with an input end of the second buffer, an output end of the second buffer is connected with ground through the fourth capacitor, the output end of the OR gate outputs the first signal for controlling the first switch.

Preferably, the switching circuit further comprises a second switch connected with the first switch in parallel, wherein the output end of the second buffer outputs a second signal for controlling the second switch.

Preferably, the charge pump circuit further comprises a first capacitor and a second capacitor, the switching circuit further comprises a third switch for controlling a discharge speed, the control circuit further comprises an AND gate and a first buffer connected with the AND gate, wherein two input ends of the AND gate respectively receive the two input signals, an output end of the AND gate is connected with ground through the first capacitor and connected with an input end of the first buffer, an output end of the first buffer is connected with ground through the second capacitor, the output end of the AND gate outputs a third signal for controlling the third switch.

Preferably, the switching circuit further comprises a fourth switch connected with the third switch in parallel, wherein the output end of the first buffer outputs a fourth signal for controlling the fourth switch.

Preferably, the switching circuit further comprises an operational amplifier, and a first, second, third and fourth field effect transistors connected with the operational amplifier, wherein the first and second field effect transistors are connected with the first and second switches, the third and fourth field effect transistors are connected with the third and fourth switches.

Preferably, a grid electrode of the first field effect transistor and a grid electrode of the third field effect transistor are respectively connected with the two input ends of the OR gate, a source electrode of the first field effect transistor is connected with a power supply through the first and second switches, a source electrode of the second field effect transistor is connected with the source electrode of the first field effect transistor, a drain electrode of the second field effect transistor is connected with an output end of the operational amplifier.

Preferably, a source electrode of the third field effect transistor is connected with ground through the third switch and the fourth switch, a source electrode of the fourth field effect transistor is connected with the source electrode of the third field effect transistor, a drain electrode of the fourth field effect transistor is connected with the output end of the operational amplifier, a drain electrode of the first field effect transistor, a drain electrode of the third field effect transistor and a positive input end of the operational amplifier are connected with an output end, a negative input end of the operational amplifier is connected with the output end thereof.

Compared with the prior art, the charge pump circuit of the present invention can automatically adjust the charge and discharge currents based on the pulse width of the output signal of the phase frequency detector, thereby changing the loop bandwidth of the phase locked loop and quickening the locking time of the phase locked loop. Furthermore, when the phase locked loop is locked up, no extra power consumption is generated, namely, only a branch of working current is kept.

These and other objectives, features, and advantages of the present invention will become apparent from the following detailed description, the accompanying drawings, and the appended claims.

BRIEF DESCRIPTION OF THE DRAWINGS

The drawing is a circuit diagram of a charge pump circuit according to a preferred embodiment of the present invention.

DETAILED DESCRIPTION OF THE PREFERRED EMBODIMENT

Referring to the drawing, a charge pump circuit according to a preferred embodiment of the present invention is illustrated, wherein the charge pump circuit comprises a control circuit and a switching circuit.

The control circuit comprises an AND gate AND, an OR gate OR, a first buffer BUF1 connected with the AND gate AND, and a second buffer BUF2 connected with the OR gate OR. Two input ends UP and DW of the control circuit are respectively connected with two input ends of the AND gate AND, and the two input ends UP and DW of the control circuit are respectively connected with two input ends of the OR gate OR. The output end of the AND gate AND is connected with ground through the capacitor C1. The AND gate AND outputs a signal DW_1 to the input end of the first buffer BUF1. The output end of the first buffer BUF1 outputs a signal DW_2 and is connected with ground through the capacitor C2. The output end of the OR gate OR is connected with ground through the capacitor C3 and outputs the signal UP_1 to the input end of the second buffer BUF2. The output end of the second buffer BUF2 outputs the signal UP_2 and is connected with ground through the capacitor C4.

The switching circuit comprises a power supply VDD, a ground GND, an operational amplifier, a first field effect transistor (FET) MPA, a second field effect transistor MPB, a third field effect transistor MNA, a fourth field effect transistor MNB, a first switch K1, a second switch K2, a third switch K3 and a fourth switch K4. Ip_0 and Iw_0 are the working currents, Ip_1 and Ip_2 are the current sources, and Iw_1 and Iw_2 are the current sinks. The switches K1, K2, K3 and K4 are respectively controlled by the signals UP_1, UP_2, DW_1 and DW_2. In the preferred embodiment of the present invention, the first FET MPA and the second FET MPB are P-type FETs (PMOS), and the third FET MNA and the fourth FET MNB are N-type FETs (NMOS). In other preferred embodiments, the FETs can be replaced by other switching components or circuits which are capable of achieving the same function as required.

The grid electrode of the first FET MPA is connected with the input end UP, the source electrode of the first FET MPA is connected with the power supply VDD through the first switch K1 and the second switch K2 connected with the first switch K1 in parallel, the drain of the first FET MPA is connected with the output end VCN. The grid electrode of the second FET MPB is connected with the signal end UPB, the source electrode of the second FET MPB is connected with the source electrode of the first FET MPA, and the drain electrode of the second FET MPB is connected with the output end of the operational amplifier. The grid electrode of the third FET MNA is connected with the input end DW, the source electrode of the third FET MNA is connected with ground GND through the third switch K3 and the fourth switch K4 connected with the third switch K3 in parallel, the drain electrode of the third FET MNA is connected with the output end VCN. The grid electrode of the fourth FET MNB is connected with the signal end DWB, the source electrode of the fourth FET MNB is connected with the source electrode of the third FET MNA, and the drain electrode of the fourth FET MNB is connected with the output end of the operational amplifier. The positive input end of the operational amplifier is connected with the output end VCN, and the negative input end of the operational amplifier is connected with the output end thereof. The signal end UPB and the input end UP form the differential signal ends, and the signal end DWB and the input end DW form the differential signal ends.

The operating principle of the charge pump circuit of the present invention is described as follows. When the input ends UP and DW are kept at the high-level for a long time, the PLL is at the initial locking stage, the first capacitor C1 is charged by the AND gate AND such that the signal DW_1 is high-level. Here, the switches K3 and K4 are respectively closed when the signals DW_1 and DW_2 are high-level, and the switches K3 and K4 are respectively open when the signals DW_1 and DW_2 are low-level. Therefore, the third switch K3 is closed and the discharge is quickened. When the input ends UP and DW are kept at the high-level for a longer time, the fourth switch K4 will be closed such that the discharge current will be bigger. When the input ends UP and DW are kept at the low-level for a long time, the voltage of the signal UP_1 is decreased by the OR gate OR. It is worth to mention that the switches K1 and K2 are respectively closed when the signals UP_1 and UP_2 are low-level, and the switches K1 and K2 are respectively open when the signals UP_1 and UP_2 are high-level. Therefore, the first switch K1 is closed and the increase of the voltage of VCN is quickened, namely, charging the VCN is quickened. When the input ends UP and DW are kept at the low-level for a longer time, the second switch K2 will be closed, such that the charge current will be bigger. When the input ends UP and DW are kept at the high-level or low-level for a short time, the switches K1, K2, K3 and K4 will not always be closed, that is to say that the controllable current Ip_1, Ip_2, Iw_1 and Iw_2 will not always be turn on.

According to the impulse width of the output signal of the phase frequency detector, the charge pump circuit of the present invention can automatically adjust the charge and discharge currents, thereby changing the loop bandwidth of the phase locked loop and quickening the locking time of the phase locked loop. Furthermore, when the phase locked loop is locked up, no extra power consumption is generated, namely, only a branch of working current is kept.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A charge pump circuit, comprising a switching circuit for providing a charge and discharge current, a control circuit for controlling said switching circuit, a third capacitor and a fourth capacitor,
   wherein said switching circuit comprises a first switch for controlling a charging speed;
   wherein said control circuit generates a first signal for controlling said first switch based on a pulse width of an input signal, said first switch is closed when said first signal is low-level and said first switch is open when said first signal is high-level; and
   wherein said control circuit comprises an OR gate and a second buffer connected with said OR gate, wherein two input ends of said OR gate respectively receive two input signals, an output end of said OR gate is connected with ground through said third capacitor, said output end of said OR gate is connected with an input end of said second buffer, an output end of said second buffer is connected with ground through said fourth capacitor, said output end of said OR gate outputs said first signal for controlling said first switch.

2. The charge pump circuit, as recited in claim 1, wherein said switching circuit further comprises a second switch connected with said first switch in parallel, said output end of said second buffer outputs a second signal for controlling said second switch, said second switch is closed when said second signal is low-level and said second switch is open when said second signal is high-level.

3. The charge pump circuit, as recited in claim 2, further comprising a first capacitor and a second capacitor, wherein said switching circuit further comprises a third switch for controlling a discharge speed, said control circuit further comprises an AND gate and a first buffer connected with said AND gate, wherein two input ends of said AND gate respectively receive said two input signals, an output end of said AND gate is connected with ground through said first capacitor and connected with an input end of said first buffer, an output end of said first buffer is connected with ground through said second capacitor, said output end of said AND gate outputs a third signal for controlling said third switch, said third switch is closed when said third signal is high-level and said third switch is open when said third signal is low-level.

4. The charge pump circuit, as recited in claim 3, wherein said switching circuit further comprises a fourth switch connected with said third switch in parallel, said output end of said first buffer outputs a fourth signal for controlling said fourth switch, said fourth switch is closed when said fourth signal is high-level and said fourth switch is open when said fourth signal is low-level.

5. The charge pump circuit, as recited in claim 4, wherein said switching circuit further comprises an operational amplifier, and a first, second, third and fourth field effect transistors connected with said operational amplifier, wherein said first and second field effect transistors are connected with said first and second switches, said third and fourth field effect transistors are connected with said third and fourth switches.

6. The charge pump circuit, as recited in claim 5, wherein a grid electrode of said first field effect transistor and a grid electrode of said third field effect transistor are respectively connected with said two input ends of said OR gate, a source electrode of said first field effect transistor is connected with a power supply through said first and second switches, a source electrode of said second field effect transistor is connected with said source electrode of said first field effect transistor, a drain electrode of said second field effect transistor is connected with an output end of said operational amplifier.

7. The charge pump circuit, as recited in claim 6, wherein a source electrode of said third field effect transistor is connected with ground through said third switch and said fourth switch, a source electrode of said fourth field effect transistor is connected with said source electrode of said third field effect transistor, a drain electrode of said fourth field effect transistor is connected with said output end of said operational amplifier, a drain electrode of said first field effect transistor, a drain electrode of said third field effect transistor and a positive input end of said operational amplifier are connected with an output end of said switching circuit, a negative input end of said operational amplifier is connected with said output end of said operational amplifier, a grid electrode of said second field effect transistor and said grid electrode of said first field effect transistor input a first pair of differential signals, a grid electrode of said fourth field effect transistor and said grid electrode of said third field effect transistor input a second pair of differential signals.

8. The charge pump circuit, as recited in claim 5, wherein said first and second field effect transistors are PMOS transistors, said third and fourth field effect transistors are NMOS transistors.

9. The charge pump circuit, as recited in claim 6, wherein said first and second field effect transistors are PMOS transistors, said third and fourth field effect transistors are NMOS transistors.

10. The charge pump circuit, as recited in claim 7, wherein said first and second field effect transistors are PMOS transistors, said third and fourth field effect transistors are NMOS transistors.

* * * * *